United States Patent Office 3,447,933
Patented June 3, 1969

3,447,933
RAPIDLY SOLUBLE FOOD COLORS
Addison M. Smith and Percy Perletz, Buffalo, N.Y., assignors to Allied Chemical Corporation, New York, N.Y., a corporation of New York
No Drawing. Filed Sept. 14, 1966, Ser. No. 579,207
Int. Cl. A23l 1/26
U.S. Cl. 99—148                      6 Claims

ABSTRACT OF THE DISCLOSURE

A process for the production of water-soluble food colors having an improved rate of solubility in cold water comprising atomizing an aqueous dyestuff composition, in particular FD&C Red No. 2, FD&C Yellow No. 4 and FD&C Yellow No. 6, at a temperature between about 80 and 110° C. into a stream of heated gas maintained at a temperature in excess of 110° C.

---

This invention relates to edible water soluble azo dyestuffs having improved solubility characteristics.

The edible water soluble azo dyestuffs such as the FD&C certified colors ("food colors") are employed as colorants in various dry powdered or granulated food mixes, such as the so-called "instant" beverage mixes. It is particularly desirable that the ingredients be rapidly soluble in cold water in order that the final product prepared from such mixes can be prepared with a minimum of effort on the part of the consumer. The food colors employed previously, while being quite soluble in water, have not been completely satisfactory with respect to rate of solution, especially in cold (10 to 20 degrees centigrade) water.

It is, therefore, an object of the present invention to provide a method of improving the rate of solubility of food colors in cold water. It is a further object to provide food colors having improved solubility characteristics.

It has now been found that water-soluble food colors having improved rate of solubility are prepared by atomizing an aqueous slurry of the dyestuff at a temperature of between about 80 and 110 degrees centigrade into a stream of heated gas maintained at a temperature in excess of 110 degrees centigrade. The process of this present invention is applicable to the production of rapidly soluble edible azo dyestuffs and in particular, FD&C Red No. 2 (Color Index No. 16185), FD&C Yellow No. 5 (Color Index No. 19140) and FD&C Yellow No. 6 (Color Index No. 15985).

The drying of materials by atomization into a heated gas stream, generally referred to as "spray drying," may be effected in various types of commercial spray drying apparatus. A general description of such apparatus is found in Chemical Engineers' Handbook, John H. Perry, third edition, (1950) McGraw-Hill Book Company, Inc., pages 838–848. As described therein, atomization is generally accomplished in such dryers, by passing a pumpable liquid through (1) a pressure nozzle, (2) a two fluid nozzle, or (3) a high speed rotating disc. In accordance with the present invention, it has been found that the desired rapid solubility characteristics are achieved by atomization of aqueous dyestuff composition described in detail hereinbelow, through a pressure nozzle type of atomizer.

The drying procedure of the present invention may be applied to a previously prepared and dried dye-stuffs or alternatively it may be employed in place of the conventional drying of the wet press cake formed in the normal dyestuff preparation.

The aqueous composition to be atomized is prepared by simply mixing the dye, either dry or wet, such as in a wet filter cake, with the desired amount of water. It is preferred that the aqueous composition be in the form of a slurry rather than a solution in order to achieve the maximum rapid solubility characteristics in the final product. That is to say, the dyestuff is preferably present in both the dissolved and undissolved state when atomized. In general, suitable compositions will comprise between about 52 and 68 percent by weight of water and between about 32 and 48 percent by weight of total dissolved and undissolved solids. Preferred compositions are those having a water content of between about 58 and 64 percent by weight and a total solids content of between about 36 and 42 percent by weight. The total solids are predominantly the dyestuff to be prepared; however, other inert solids, such as sodium chloride may be present for example in amounts up to about 3 percent by weight of the aqueous slurry.

The nozzle temperature that is, the temperature of the slurry immediately prior to atomization is maintained, between about 80 and about 110 degrees centigrade. When temperatures outside of this range are employed, the rapid solubility characteristics of the final product are not achieved. Preferably the nozzle temperature is maintained between about 85 and about 95 degrees centigrade.

The heated gas stream into which the aqueous slurry is atomized may comprise any gas or mixture of gases which is chemically inert to the material being dried, for example, air, carbon dioxide, nitrogen, etc. For economic considerations air is preferred. Considerable variation in the temperature of the heated gas stream is permissible depending on the flow rate of the gas stream, and the retention time of the dyestuff particles in the drier. However, in general, the temperature of the gas is maintained between about 110 and 400 degrees centigrade and the flow rate of the gas stream and retention time are sufficient to effect drying of the dyestuff to a free-flowing particulate state. Usually the dried dyestuffs will have a moisture content of less than about 15% by weight. Normal retention time will be between about 0.25 and 2.0 minutes and preferably between about 0.5 and 1.0 minute while the usual flow rates will be between about 3000 and 30,000 standard cubic feet per minute, however, considerable variation is permissible. The direction of the heated gas stream may be either co-current or counter-current (or both as in the case with some types of commercial spray drying apparatus). However, the use of a co-current gas stream has proven most satisfactory, and hence is to be preferred.

The pressure at which the aqueous slurry is forced through the nozzle depends in part on the diameter of the nozzle. Although considerable variation is permissible, in this instance also, pressures between about 5 and about 40 and preferably between about 10 and about 20 kilograms per square centimeter and nozzle diameter (inside diameter) of between about 1.0 and 2.5 millimeters ID has been found most satisfactory. In a preferred embodiment a nozzle having a diameter of between about 1.2 and 1.8 millimeters ID is employed and the aqueous slurry is forced through the nozzle at a pressure of between about 10 and 20 kilograms per square centimeter.

By way of further illustration of the present invention and the manner in which it may be practiced, the following specific examples are set forth. In the examples, unless otherwise indicated all temperatures are in degree centigrade.

Example 1

136 kilograms of an aqueous press cake of FD&C Red No. 2, containing 53 percent by weight of water, was mixed with 36.8 kg. of water to form an aqueous slurry containing 37 percent by weight total solids. The slurry was thoroughly mixed with a propeller type stirrer and heated to a temperature of 80 to 95°. The slurry was fed through a steam jacketed feed line and sprayed through a nozzle into a co-current air stream in a spray tower 1.7 meters in diameter and 8 meters high. The nozzle diameter was 1.3 mm. ID and the slurry was forced through at a pressure of 10 kilograms per square centimeter. The temperature of the slurry at the nozzle was 110 degrees. The dried product containing 4.3 percent by weight volatile matter (mainly water) was collected at the bottom of the spray tower and the air stream wan exited to a cyclone separator where fines were collected. A summary of operating conditions of the spray tower is as follows:

| | |
|---|---|
| Water in feed slurry _____percent by wt__ | 63 |
| Total solids in feed slurry _____percent by wt__ | 37 |
| Feed temperature at nozzle _____deg__ | 110 |
| Nozzle bore _____mm. I.D__ | 1.3 |
| Feed pressure at nozzle _____kg. per sq. cm__ | 10 |
| Air rate _____kg. per hr__ | 1100 |
| Inlet air temperature _____deg__ | 350 |
| Outlet air temperature _____deg__ | 140 |
| Length of run _____min__ | 22 |

The rate of solution of the spray dried dyestuff, prepared as described above, was determined in the following manner: 100 milligrams of the dyestuff was added to 500 milliliters of water, at 20 degrees, and the mixture was mechanically agitated. The rate of solution was determined as the length of time required for complete solution of the dye sample. For purposes of comparison, a similar determination was made for two samples of conventionally dried FD&C Red No. 2. The bulk density, screen analysis, and rates of solution of the dyes are as follows:

| | FD&C Red No. 2 prepared according to Example 1 | FD&C Red No. 2 dried in a conventional manner, i.e., pan dried at 110 to 125 degrees, and ground | |
|---|---|---|---|
| | A | B | C |
| Screen analysis: | | | |
| Through 6 mesh,[1] percent_____ | | | 100 |
| Through 20 mesh, percent_____ | 100 | 100 | |
| Retained on 30 mesh, percent_____ | | | 90 |
| Through 30 mesh, percent_____ | 99.9 | 100 | |
| Through 40 mesh, percent_____ | 99.6 | 100 | |
| Through 60 mesh, percent_____ | 97.6 | 97.5 | |
| Through 80 mesh, percent_____ | 82.8 | 94.65 | |
| Through 100 mesh, percent_____ | 79.9 | 92.0 | |
| Through 200 mesh, percent_____ | 22.0 | 89.6 | |
| Bulk density (grams per milliliter): | | | |
| Initial_____ | .50 | .34 | .43 |
| Tapped 15 times [2]_____ | .63 | .50 | .48 |

[1] U.S. Standard Sieve Series.
[2] 10 grams of sample are placed in a graduated glass cylinder having about a 1 inch inside diameter and the cylinder is maintained in a vertical positon while it is dropped 15 times from a height of 6 inches to a rubber base.

Rates of solution (sec.):
A _____ 15
B _____ 45
C _____ 240

When in place of the 136 kilograms of FD&C Red No. 2 in the above example, there is substituted a like amount of FD&C Yellow No. 5 or FD&C Yellow No. 6, similar improvements in solubility rates are effected.

Example 2

A uniform aqueous slurry of FD&C Red No. 2 was prepared by intimately mixing 136 kilograms of an aqueous press cake of the dyestuff (containing 53 percent by weight of water) with an additional 24.5 kg. of water, and agitating the mixture with a Varicinetic Dissolver (a high shear mixing device). The final slurry, having a total solids content of 39 percent by weight, was spray-dried in the manner described in Example I except that process conditions were varied as shown below:

| | |
|---|---|
| Water in feed slurry _____percent by wt__ | 61 |
| Total solids in feed slurry _____percent by wt__ | 39 |
| Feed temperature at nozzle _____deg__ | 92 |
| Nozzle bore _____mm. I.D__ | 1.3 |
| Feed pressure at nozzle _____kg. per sq. cm__ | 10 |
| Air rate _____kg. per hr__ | 1250 |
| Inlet air temperature _____deg__ | 350 |
| Outlet air temperature _____deg__ | 140 |
| Length of run _____min__ | 118 |

The bulk density, screen analysis and rate of solution of the dye, determined as in Example 1, were as follows.

Screen analysis (mesh):
| | | |
|---|---|---|
| Through 20 | Percent__ | 100 |
| Through 30 | do____ | 100 |
| Through 40 | do____ | 99.8 |
| Through 60 | do____ | 98.6 |
| Through 80 | do____ | 59.7 |
| Through 100 | do____ | 49.9 |
| Through 200 | do____ | 7.6 |

Bulk density (grams/milliliter):
| | |
|---|---|
| Initial | .44 |
| Tapped 15 times | .50 |
| Rate of solution _____seconds__ | 25 |

Example 3

The procedure of Example 2 was repeated. The physical properties of the dried dyestuff, determined as in Example 1, were as follows.

Screen analysis (mesh):
| | | |
|---|---|---|
| Through 20 | Percent__ | 100 |
| Through 30 | do____ | 100 |
| Through 40 | do____ | 99.9 |
| Through 60 | do____ | 98.5 |
| Through 80 | do____ | 56.5 |
| Through 100 | do____ | 87.3 |
| Through 200 | do____ | 5.0 |

Bulk density (grams/milliliter):
| | |
|---|---|
| Initial | .43 |
| Tapped 15 times | .51 |
| Rate of solution _____seconds__ | 20 |

It will be apparent to those skilled in the art that many other variations and modifications of the invention as hereinabove set forth may be made without departing from the spirit and scope of the invention. The invention is not limited to those details and applications described, except as set forth in the appended claims.

We claim:
1. The process of preparing a food color having an improved rate of solubility in cold water, said process comprising
   (a) providing an aqueous dyestuff composition, said dyestuff being selected from the group consisting of FD&C Red No. 2, FD&C Yellow No. 5 and FD&C Yellow No. 6;
   (b) heating said aqueous dyestuff composition to a temperature of between about 80 and about 110 degrees centigrade;
   (c) atomizing said aqueous dyestuff composition through a pressure nozzle into a stream of inert gas, said gas being maintained at a temperature in excess of 110 degrees centigrade;
   (d) recovering said dyestuff from the gas stream as free-flowing particles.
2. The process according to claim 1 wherein said dye is FD&C Red No. 2.
3. The process according to claim 2 wherein said aqueous dyestuff composition comprises between about 52 and about 68 percent by weight of water and between about 32 and about 48 percent by weight of total dissolved and undissolved solids.

4. The process according to claim 3 wherein the temperature of said aqueous dyestuff composition prior to entering said gas stream is between about 85 to 95 degrees centigrade.

5. The process according to claim 4 wherein the moisture content of said free-flowing particles is less than about 15 percent by weight.

6. The process according to claim 5 wherein the inside diameter of said nozzle is between about 1.0 and about 2.5 millimeters and said aqueous dyestuff composition is atomized at a nozzle pressure of between about 5 and about 40 kilograms per square centimeter.

References Cited

UNITED STATES PATENTS 2,071,492  2/1937  Boehmer _____ 99—148 X

OTHER REFERENCES

Perry et al., Perry's Chemical Engineer's Handbook, McGraw-Hill Book Co. Inc., New York, 1963, Sec. 20, pp. 57–59.

RAYMOND N. JONES, *Primary Examiner.*

H. H. KLARE III, *Assistant Examiner.*